(12) United States Patent
Ueda et al.

(10) Patent No.: US 10,415,857 B2
(45) Date of Patent: Sep. 17, 2019

(54) REFRIGERATOR AND OPERATION METHOD FOR REFRIGERATOR

(71) Applicant: MAYEKAWA MFG. CO., LTD., Tokyo (JP)

(72) Inventors: Shota Ueda, Tokyo (JP); Akito Machida, Tokyo (JP); Mizuo Kudo, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 118 days.

(21) Appl. No.: 15/563,562

(22) PCT Filed: May 1, 2015

(86) PCT No.: PCT/JP2015/063108
§ 371 (c)(1),
(2) Date: Sep. 30, 2017

(87) PCT Pub. No.: WO2016/178272
PCT Pub. Date: Nov. 10, 2016

(65) Prior Publication Data
US 2018/0087809 A1    Mar. 29, 2018

(51) Int. Cl.
*F25B 11/02*    (2006.01)
*F25B 1/10*    (2006.01)
(Continued)

(52) U.S. Cl.
CPC ............ *F25B 11/02* (2013.01); *F04D 13/024* (2013.01); *F25B 1/10* (2013.01); *F25B 11/04* (2013.01);
(Continued)

(58) Field of Classification Search
CPC .......... F25B 11/02; F25B 45/00; F25B 40/00; F25B 2400/072; F25B 2400/16;
(Continued)

(56) References Cited

U.S. PATENT DOCUMENTS 6,310,414 B1 * 10/2001 Agahi ...................... F01D 3/04
310/40.5
7,322,207 B2    1/2008 Kikuchi et al.
(Continued)

FOREIGN PATENT DOCUMENTS

| CN | 101243295 | 8/2008 |
|---|---|---|
| CN | 102257332 | 11/2011 |

(Continued)

OTHER PUBLICATIONS

"Office Action of Korea Counterpart Application", dated Nov. 28, 2018, with English translation thereof, p. 1-p. 8.
(Continued)

*Primary Examiner* — Emmanuel E Duke
(74) *Attorney, Agent, or Firm* — JCIPRNET

(57) ABSTRACT

A refrigerator according to the present invention includes: a cooling part for cooling an object to be cooled through heat exchange with a refrigerant; an expander-integrated compressor including a compressor for compressing the refrigerant and an expander for expanding the refrigerant integrated therein; and a refrigerant circulation line configured to circulate the refrigerant through the compressor, the expander, and the cooling part. The compressor includes a low-stage compressor, a middle-stage compressor, and a high-stage compressor disposed in series in the refrigerant circulation line. The expander-integrated compressor includes: the middle-stage compressor; an expander for adiabatically expanding and cooling the refrigerant discharged from the high-stage compressor; a first motor having an output shaft connected to the middle-stage compressor and to the expander; at least one non-contact type bearing, disposed between the middle-stage compressor and the expander, for supporting the output shaft of the first motor without being in contact with the output shaft; and a
(Continued)

casing for housing the middle-stage compressor, the expander, and the at least one non-contact type bearing.

16 Claims, 5 Drawing Sheets

(51) Int. Cl.
| | | |
|---|---|---|
| F25B 11/04 | (2006.01) | |
| F25B 25/00 | (2006.01) | |
| F25J 1/00 | (2006.01) | |
| F25J 1/02 | (2006.01) | |
| F04D 13/02 | (2006.01) | |
| F25B 49/02 | (2006.01) | |
| F25D 11/00 | (2006.01) | |
| F25B 40/00 | (2006.01) | |
| F25B 45/00 | (2006.01) | |
| H01F 6/04 | (2006.01) | |

(52) U.S. Cl.
CPC .......... *F25B 25/005* (2013.01); *F25B 49/022* (2013.01); *F25D 11/00* (2013.01); *F25J 1/005* (2013.01); *F25J 1/007* (2013.01); *F25J 1/0062* (2013.01); *F25J 1/0065* (2013.01); *F25J 1/0067* (2013.01); *F25J 1/0072* (2013.01); *F25J 1/0092* (2013.01); *F25J 1/0265* (2013.01); *F25J 1/0284* (2013.01); *F25J 1/0288* (2013.01); *F25J 1/0298* (2013.01); *F25B 40/00* (2013.01); *F25B 45/00* (2013.01); *F25B 2400/072* (2013.01); *F25B 2400/16* (2013.01); *F25B 2600/2523* (2013.01); *F25J 2270/912* (2013.01); *H01F 6/04* (2013.01)

(58) Field of Classification Search
CPC .... F25B 1/005; F25B 1/10; F25B 9/14; F25B 49/022; F25B 11/04; F25B 25/005; F25B 2600/2523; F25D 11/00; F04D 29/058; F04D 13/024; H01F 6/04; F25J 2270/912; F25J 1/0072; F25J 1/0265; F25J 1/005; F25J 1/0298; F25J 1/0288; F25J 1/0284; F25J 1/0062; F25J 1/0092; F25J 1/0065; F25J 1/007; F25J 1/0067
See application file for complete search history.

(56) References Cited

U.S. PATENT DOCUMENTS

| | | | | |
|---|---|---|---|---|
| 7,552,598 | B2* | 6/2009 | Paradowski | F25J 1/0022 62/611 |
| 2006/0225461 | A1 | 10/2006 | Paradowski | |
| 2007/0101755 | A1 | 5/2007 | Kikuchi et al. | |
| 2007/0101756 | A1 | 5/2007 | Okuda et al. | |
| 2009/0232663 | A1* | 9/2009 | Mirsky | F01D 21/02 417/42 |
| 2009/0260388 | A1* | 10/2009 | Nakazeki | F16C 19/54 62/402 |
| 2010/0024474 | A1* | 2/2010 | Kaart | F25B 11/02 62/612 |
| 2010/0275616 | A1 | 11/2010 | Saji et al. | |
| 2011/0041526 | A1 | 2/2011 | Okuda et al. | |
| 2011/0247358 | A1 | 10/2011 | Wada et al. | |
| 2016/0018134 | A1* | 1/2016 | Ueda | F25B 1/10 62/510 |
| 2016/0076793 | A1* | 3/2016 | Nakamura | F25B 1/10 62/402 |

FOREIGN PATENT DOCUMENTS

| | | |
|---|---|---|
| EP | 1913117 | 4/2008 |
| JP | H0791760 | 4/1995 |
| JP | H10148408 | 6/1998 |
| JP | H11159898 | 6/1999 |
| JP | H11211244 | 8/1999 |
| JP | 2001123997 | 5/2001 |
| JP | 2005098604 | 4/2005 |
| JP | 2006118772 | 5/2006 |
| JP | 2008536078 | 9/2008 |
| JP | 2008298322 | 12/2008 |
| JP | 2009121786 | 6/2009 |
| JP | 4370328 | 11/2009 |
| JP | 2010043780 | 2/2010 |
| JP | 2010516994 | 5/2010 |
| JP | 2012073002 A * | 4/2012 |
| JP | 2013155972 | 8/2013 |
| JP | 2014001916 | 1/2014 |
| JP | 2014126284 | 7/2014 |
| JP | 2014219125 | 11/2014 |
| JP | 2014219125 A * | 11/2014 ............... F25B 1/10 |
| KR | 2007056710 | 3/2007 |
| KR | 20100049726 | 5/2010 |
| RU | 26254 | 11/2002 |
| RU | 2330994 | 8/2008 |
| WO | 2006011248 | 2/2006 |
| WO | 2006011297 | 2/2006 |
| WO | 2014178240 | 11/2014 |
| WO | 2015068522 | 5/2015 |

OTHER PUBLICATIONS

"International Preliminary Report on Patentability; this report contains the following items :Form PCT/IB/326, PCT/IB/338, PCT/IB/373, PCT/ISA237(cover sheet), PCT/ISA237(Box No. I), PCT/ISA237(Box No. V), PCT/ISA237(Box No. VI), PCT/ISA237(Box No. VII)", dated Jun. 30, 2015, which is English translation of "Written Opinion of the International Searching Authority", p. 1-p. 21.
"Office Action of Japan Counterpart Application" dated Mar. 9, 2018, with English translation thereof, p. 1-p. 12.
"Office Action of Japan Counterpart Application," with machine English translation thereof, dated Oct. 5, 2018, p. 1-p. 12.
"Office Action of Russia Counterpart Application," with English translation thereof, dated Sep. 11, 2017, p. 1-p. 11.
"Search Report of Europe Counterpart Application", dated Jan. 22, 2018, p. 1-p. 9.
The applicant's informal comments on the written opinion of the International Searching Authority (Form PCT/ISA/237) submitted Oct. 11, 2016, p. 1.
"International Search Report (Form PCT/ISA/210) of PCT/JP2015/063108", dated Jun. 30, 2015, with English translation thereof, pp. 1-4.
"International Preliminary Report on Patentability of PCT/JP2014/077109; this report contains the following items :Form PCT/IB/338, Form PCT/IB/373, PCT/ISA237(cover sheet), PCT/ISA237(Box No. I),PCT/ISA237 (Box No. V), PCT/IB/326", dated May 17, 2016, which is English translation of "Written Opinion of the International Searching Authority", p. 1-p. 13.
"Search Report of Europe Counterpart Application," dated Sep. 30, 2016, p. 1-p. 5.
"Office Action of China Counterpart Application," dated Jun. 1, 2017, with English translation thereof, p. 1-p. 9.
"Restriction Requirement of U.S. Appl. No. 15/034,179," dated Jun. 15, 2017,p. 1-8.
"Office Action of Japan Counterpart Application," dated Aug. 18, 2017, with English translation thereof, p. 1-p. 8.
"Office Action of U.S. Counterpart Application," dated Aug. 16, 2017, p. 1-p. 23.
"Office Action of Korea Counterpart Application," dated Aug. 23, 2017,with English translation thereof, p. 1-p. 12.
Office Action of China Counterpart Application, with English translation thereof, dated May 5, 2019, pp. 1-12.
"Office Action of Japan Counterpart Application", dated Apr. 9, 2019, with English translation thereof, p. 1-p. 11.

* cited by examiner

REFRIGERATOR AND OPERATION METHOD FOR REFRIGERATOR

CROSS-REFERENCE TO RELATED APPLICATION

This application is a 371 application of the international PCT application serial no. PCT/JP2015/063108, filed on May 1, 2015. The entirety of each of the abovementioned patent applications is hereby incorporated by reference herein and made a part of this specification.

TECHNICAL FIELD

The present disclosure relates to a refrigerator including an expander-integrated compressor and a method of operating the refrigerator.

BACKGROUND ART

A known refrigerator uses the Brayton cycle as a refrigerating cycle and includes an expander-integrated compressor capable of cryogenic cooling. Further, in some cases, a non-contact type bearing such as a magnetic bearing is provided to support an output shaft of a motor for driving an expander-integrated compressor. A non-contact type bearing supports a rotational shaft such as an output shaft of a motor without making contact with the rotational shaft, and does not generate mechanical friction loss and abrasion with the rotational shaft, thus having a high durability compared with a roller bearing that supports a rotational shaft while making contact with the rotational shaft. Thus, for a motor that operates at a high rotation speed, for instance, a non-contact type bearing such as a magnetic bearing is provided to support an output shaft of the motor.

Patent Document 1 discloses an expander-integrated compressor provided with such a non-contact type bearing. The disclosed expander-integrated compressor is a magnetic-bearing type turbine compressor including a turbine impeller and a compressor impeller mounted to either end of a shaft, with a magnetic bearing pivotally supporting the shaft.

With a refrigerator provided with the expander-integrated compressor as disclosed in Patent Document 1, a part of expansion energy generated upon expansion of a fluid by the expander is recovered, and the recovered expansion energy is reused as rotational energy of a motor rotational shaft for driving the compressor. Thus, the power for driving the motor decreases, and the coefficient of performance (COP) of the refrigerator improves.

However, with the recent development in the cryogenic technologies, there is a need for further improvement of the coefficient of performance (COP) to further enhance the energy conservation property of refrigerators that use the Brayton cycle.

In an expander-integrated compressor, deterioration of the adiabatic efficiency of the expander and a decrease in COP of the refrigerator may be caused by heat penetration due to a refrigerant passing through a region formed inside an interior space of a casing due to a pressure difference between the compressor and the expander, leaking from the back-face side of the compressor toward the expander.

Meanwhile, a known refrigerator includes a plurality of compressors provided in more than one stages, to improve the compression ratio of the compressors to perform cryogenic cooling.

Patent Document 2 discloses a refrigerating air conditioner with two stages of compressors and expanders, which performs a two-stage compression and two-stage expansion cycle. In this device, an expander-integrated compressor, which integrally includes a high-stage compressor and the first and second expanders, is housed in a sealed vessel, which makes it no longer necessary to provide a seal between the compressors and the expanders.

In Patent Document 3, to solve the above problem of an expander-integrated compressor, leaking refrigerant is returned to the intake side or the discharge side of the compressor from an extraction line disposed in a casing.

CITATION LIST

Patent Literature

Patent Document 1: JPH7-91760A
Patent Document 2: 2005-98604A
Patent Document 3: specification and drawings of PCT/JP2014/077109 (not yet published)

SUMMARY

Problems to be Solved

As described above, in a refrigerator provided with an expander-integrated compressor, the refrigerating performance may be deteriorated by a high-temperature refrigerant that passes through a region formed inside an interior space of a casing of the expander-integrated compressor and leaks from the compressor side toward the expander side.

Patent Documents 1 and 2 do not disclose any solution to the above problem.

Although the solution proposed in Patent Document 3 can avoid inflow of a high-temperature refrigerant from the compressor to some extent, the amount of refrigerant to be returned to the extraction line is limited to prevent a decrease in the load capacity of the magnetic bearing and deterioration of the compressor performance.

An object of at least one embodiment of the present invention is to provide a Brayton-cycle refrigerator including an expander-integrated compressor free from the above problem and having an improved COP.

Solution to the Problems (1) A refrigerator according to at least one embodiment of the present invention comprises: a cooling part for cooling an object to be cooled through heat exchange with a refrigerant; an expander-integrated compressor including a compressor for compressing the refrigerant and an expander for expanding the refrigerant, the compressor and the expander integrated into the expander-integrated compressor; and a refrigerant circulation line configured to circulate the refrigerant through the compressor, the expander, and the cooling part. The compressor includes a low-stage compressor, a middle-stage compressor, and a high-stage compressor disposed in series in the refrigerant circulation line, and the expander-integrated compressor includes: the middle-stage compressor, an expander for adiabatically expanding and cooling the refrigerant discharged from the high-stage compressor, a first motor having an output shaft connected to the middle-stage compressor and to the expander; at least one non-contact type bearing, disposed between the middle-stage compressor and the expander, for supporting the output shaft of the first motor without being in contact with the output shaft; and a casing for housing the middle-stage compressor, the expander, and the at least one non-contact type bearing.

In an expander-integrated compressor, a region between the expander and the compressor, within the interior space of the casing, is not a flow path originally intended for the working fluid to flow through. Thus, a seal is normally provided between the compressor and the region, and between the expander and the region, so that the working fluid does not leak to the above region from the compressor and the expander. However, even though such seals are provided, it is difficult to seal the working fluid completely and prevent leakage from the compressor.

As a result of intensive researches conducted by the present inventors, it was found that a pressure difference between the compressor side and the expander side brings about leakage of a part of the working fluid compressed by the compressor to the expander side through a minute gap of the seal from the compressor side via the region, and that the high-temperature leaking fluid flowing into the expander may cause a decrease in the adiabatic efficiency of the expander.

With the above configuration (1), the compressors are provided in three stages, and thus it is possible to increase the compression ratio and to reduce the temperature of the refrigerant to a cryogenically low temperature.

In a refrigerator provided with an expander-integrated compressor, it is possible to save energy by providing a plurality of stages of compressors, including a high-stage compressor that requires a great power being integrated with an expander to make up for the energy consumed by the high-stage compressor with recovered expansion energy. However, the pressure and temperature of the refrigerant leaking out from the high-stage compressor toward the expander are considerably different from the pressure and temperature of the refrigerant expanded by the expander. An extremely great quantity of heat enters the expander even though the amount of leakage is small, which may deteriorate the adiabatic efficiency of the expander and the refrigerating performance (refrigerating ability, COP) of the refrigerator considerably.

With the above configuration (1), the middle-stage compressor and the expander are integrated into the expander-integrated compressor, and thereby it is possible to reduce or substantially eliminate the pressure difference between the outlet static pressure of the middle-stage compressor and the inlet static pressure of the expander during normal operation. Accordingly, it is possible to restrict the amount of refrigerant that leaks from the compressor to the expander and heat penetration, and to suppress deterioration of the adiabatic efficiency of the expander and of the refrigerating performance of the refrigerator.

(2) In some embodiments, in the above configuration (1), the refrigerator further comprises an extraction line disposed so as to communicate with a region between the middle-stage compressor and the expander in an interior space of the casing, and configured to extract at least a part of leaking refrigerant which flows from a side of the middle-stage compressor toward the expander inside the casing from the region to the refrigerant circulation line connected to an intake side or a discharge side of the middle-stage compressor outside the casing. The casing is configured to seal the region from outside of the casing so that at least a part of the leaking refrigerant via the extraction line is the only flow of the refrigerant between the region and the outside of the casing.

Also with the above configuration (1), if the refrigerant leaks from the compressor side toward the expander, at least a part of the leaking refrigerant flowing from the compressor side toward the expander is extracted from the region to the refrigerant circulation line connected to the intake side or the discharge side of the middle-stage compressor outside the casing through the extraction line. Accordingly, even if the refrigerant is leaking from the side of the middle-stage compressor, it is possible to further reduce the amount of refrigerant that flows toward the expander, and thereby to further suppress transfer of heat to the expander via the leaking refrigerant. Thus, it is possible to prevent a decrease in the adiabatic efficiency of the expander and deterioration of the refrigerating performance of the refrigerator due to the leaking fluid from the compressor side.

If the casing is not sealed from outside and a gas other than the leaking refrigerant flowing from the region to the refrigerant circulation region is permitted to flow into the region from outside the casing, heat may transfer from the gas flowing into the region from outside the casing toward the expander having a low temperature. Thus, heat may enter the expander unexpectedly not only due to the leaking refrigerant but also to the gas flowing into the region from outside the casing, and it is difficult to prevent the cause of unexpected heat penetration into the expander even with the extraction line.

In contrast, with the expander-integrated compressor according to the above configuration (2), the region is sealed from the outside of the casing so that at least a part of the leaking refrigerant via the extraction line is the only flow between the region and the outside of the casing.

Thus, basically, the leaking liquid is the only cause of unexpected heat penetration into the expander. Accordingly, with the extraction line forming a flow of refrigerant that guides at least a part of the refrigerant flowing from the compressor side toward the expander in the above region to the refrigerant circulation line, it is possible to prevent unexpected heat penetration into the expander side and to improve COP dramatically.

(3) In some embodiments, in the above configuration (1) or (2), the refrigerator further comprises a pressure gauge for detecting a differential pressure between a pressure of a region closer to the middle-stage compressor than to the expander, in the region of the interior space of the casing, and a pressure of a region closer to the expander than to the middle-stage compressor in the region. A presence or absence of the leaking refrigerant is detected from a detection value of the pressure gauge.

With the above configuration (3), it is possible to predict the amount of refrigerant that leaks from the middle-stage compressor toward the expander accurately by detecting the pressure difference between the two regions.

Thus, it is possible to suppress heat penetration into the expander by controlling operation of the refrigerator, or by extracting the leaking refrigerant from the extraction line if the expander-integrated compressor includes the extraction line, on the basis of the above detected pressure difference.

(4) In some embodiments, in any one of the above configurations (1) to (3), the refrigerator further comprises a thermometer for detecting a temperature difference between a temperature of a region closer to the middle-stage compressor than to the expander in the region of the interior space of the casing, and a temperature of a region closer to the expander than to the middle-stage compressor in the region. A presence or absence of the leaking fluid is detected from a detection value of the thermometer.

With the above configuration (4), it is possible to predict the amount of refrigerant that leaks from the middle-stage compressor toward the expander accurately by detecting the temperature difference between the two regions.

Thus, it is possible to suppress heat penetration into the expander by controlling operation of the refrigerator, or by extracting the leaking refrigerant from the extraction line if the refrigerator includes the extraction line, on the basis of the detected temperature difference.

(5) In some embodiments, in the above configuration (3) or (4), the refrigerator further comprises: an extraction valve, disposed in the extraction line, for adjusting an extraction amount of the leaking refrigerant; and a controller for controlling an opening degree of the extraction valve on the basis of the detection value of the pressure gauge or of the thermometer.

With the above configuration (5), the opening degree of the extraction valve is controlled by the controller on the basis of the pressure difference detected by the pressure gauge or of the temperature difference detected by the thermometer, and thereby it is possible to control the amount of extraction in accordance with the amount of leaking refrigerant. Thus, it is possible to further reduce the quantity of heat that enters the expander.

(6) In some embodiments, in the above configuration (5), the controller is configured to control the opening degree of the extraction valve on the basis of at least one of: COP of the refrigerator; or a refrigerant temperature difference between an intake side and a discharge side of the expander.

The refrigerator COP can be obtained from the power consumption standard COP ($COP_b$) as in expression (1), or from the compression power standard COP ($COP_c$) as in expression (2).

(Expression 1)
$$COP\, b = \frac{(h_6 - h_5) \cdot G}{P} \quad (1)$$

(Expression 2)
$$COP\, c = \frac{h_6 - h_5}{h_2 - h_1} \quad (2)$$

In the above expressions (1) and (2), G is the mass flow rate [kg/s] of refrigerant that circulates through the refrigerant circulation line; P is the power (power consumption) [W]; $h_1$ is the inlet enthalpy [J/kg] of the compressor; $h_2$ is the outlet enthalpy [J/kg] of the compressor; $h_5$ is the inlet enthalpy [J/kg] of the heat exchanger for the cooling part; and $h_6$ is the outlet enthalpy [J/kg] of the heat exchanger for the cooling part.

The greater the amount of leaking refrigerant extracted to the refrigerant circulation line, the less the quantity of heat that flows toward the expander via the leaking refrigerant. However, if the amount of extraction is too great, there would be more leaking refrigerant that does not circulate through the refrigerant circulation line and which does not contribute to cooling of an object to be cooled, which may lead to an increase in the motor power used in compression and a decrease in the compressor efficiency. Thus, the COP of a refrigerator including the expander-integrated compressor reaches its maximum at a certain extraction amount (COP maximum extraction amount).

In view of this, with the above configuration (6), it is possible to improve COP of the refrigerator by controlling the extraction amount to a value close to the COP maximum extraction amount in accordance with the operational conditions, on the basis of at least one of the refrigerator COP or a refrigerant temperature difference between the intake side and the discharge side of the expander.

Furthermore, during operation with less changes in the conditions, the opening degree may be adjusted with a hand valve to be at a constant opening degree.

(7) In some embodiments, in any one of the above configurations (1) to (6), the refrigerator further comprises an adiabatic housing thermally insulated from outside and accommodating the expander and the cooler.

With the above configuration (7), the expander and the cooler are housed in the adiabatic housing that is thermally insulated from outside, and thereby it is possible to suppress a decrease in the adiabatic efficiency of the expander and a decrease in the refrigerating performance of the refrigerator due to penetration of external heat.

(8) In some embodiments, in any one of the above configurations (1) to (7), the refrigerator further comprises a compressor unit which includes: a second motor having an output shaft connected to the low-stage compressor and to the high-stage compressor; at least one non-contact type bearing disposed between the low-stage compressor and the high-stage compressor, for supporting the output shaft of the second motor without being in contact with the output shaft; and a casing for housing the low-stage compressor, the high-stage compressor, and the at least one non-contact type bearing.

With the above configuration (8), the compressor unit includes the low-stage compressor and the high-stage compressor, and thereby it is possible to provide the refrigerator with a simple configuration and at low costs. Further, it is possible to drive the low-stage compressor and the high-stage compressor with one motor, and thus it is possible to reduce the power required for driving the compressors as compared to a case in which the low-stage compressor and the high-stage compressor are driven independently.

(9) In some embodiments, in the above configuration (8), the refrigerator further comprises a first heat exchanger disposed in the refrigerant circulation line between the low-stage compressor and the middle-stage compressor, for cooling the refrigerant discharged from the low-stage compressor; a second heat exchanger disposed in the refrigerant circulation line between the middle-stage compressor and the high-stage compressor, for cooling the refrigerant discharged from the middle-stage compressor; and a third heat exchanger disposed in the refrigerant circulation line between the high-stage compressor and the expander, for cooling the refrigerant discharged from the high-stage compressor. The first heat exchanger, the second heat exchanger, and the third heat exchanger are disposed between the expander-integrated compressor and the compressor unit, so as to be parallel with each other in a longitudinal direction.

With the above configuration (9), the first heat exchanger, the second heat exchanger, and the third heat exchanger are disposed so as to be parallel in the longitudinal direction, and thus it is possible to reduce the installation space for the heat exchangers.

Further, the three heat exchangers are unitized to form the heat exchanger unit disposed between the expander-integrated compressor including the middle-stage compressor and the compressor unit including the low-stage compressor and the high-stage compressor, and thereby it is possible to facilitate installation of the piping to be connected to the above devices, and to reduce the length and thus costs of the piping. Further, reducing the length of the piping makes it possible to reduce pressure loss of refrigerant that flows through the piping, and thus to improve the refrigerating performance of the refrigerator.

(10) A method of operating a refrigerator according to at least one embodiment of the present invention is for a refrigerator which comprises: a cooling part for cooling an object to be cooled through heat exchange with a refrigerant; an expander-integrated compressor including a compressor for compressing the refrigerant and an expander for expanding the refrigerant, the compressor and the expander being integrated into the expander-integrated compressor, and a refrigerant circulation line configured to circulate the refrigerant through the compressor, the expander, and the cooling part. The compressor includes a low-stage compressor, a middle-stage compressor, and a high-stage compressor disposed in series in the refrigerant circulation line. The expander-integrated compressor includes: the middle-stage compressor, an expander for adiabatically expanding and cooling the refrigerant discharged from the middle-stage compressor; a first motor having an output shaft connected to the middle-stage compressor and to the expander, at least one non-contact type bearing, disposed between the middle-stage compressor and the expander, for supporting the output shaft of the first motor without being in contact with the output shaft; and a casing for housing the middle-stage compressor, the expander, or the at least one non-contact type bearing. The casing is configured to seal a region between the middle-stage compressor and the expander, of an interior space of the casing, from outside of the casing. The method comprises: a compression step of compressing the refrigerant with the three compressors; an expansion step of expanding the refrigerant compressed in the compression step with the expander; a cooling step of cooling the object to be cooled through heat exchange with the refrigerant expanded in the expansion step; and an extraction step of extracting, through an extraction line disposed so as to communicate with the region inside the casing, at least a part of leaking refrigerant which flows from a side of the middle-stage compressor toward the expander inside the casing, from the region inside the casing to the refrigerant circulation line connected to an intake side or a discharge side of the compressor outside the casing.

According to the above method (10), like the above configuration (1), if the refrigerant leaks from the compressor side toward the expander, at least a part of the leaking refrigerant flowing from the compressor side toward the expander is extracted from the region to the refrigerant circulation line connected to the intake side or the discharge side of the middle-stage compressor outside the casing through the extraction line.

Accordingly, even if the refrigerant is leaking from the side of the middle-stage compressor, it is possible to further reduce the amount of refrigerant that flows toward the expander, and thereby to further suppress transfer of heat to the expander via the leaking refrigerant. Thus, it is possible to prevent a decrease in the adiabatic efficiency of the expander and deterioration of the refrigerating performance of the refrigerator due to the leaking fluid from the compressor side.

Further, with the casing of the expander-integrated compressor, the region is sealed from the outside of the casing so that at least a part of the leaking refrigerant via the extraction line is the only flow between the region and the outside of the casing. Thus, basically, the leaking liquid is the only cause of unexpected heat penetration into the expander. Accordingly, with the extraction line forming a flow of refrigerant that guides at least a part of the refrigerant flowing from the compressor side toward the expander in the above region to the refrigerant circulation line, it is possible to prevent unexpected heat penetration into the expander side and to improve COP dramatically.

(11) In some embodiments, in the above method (10), the extraction step includes a first extraction-amount adjustment step of adjusting an extraction amount to the intake side or the discharge side of the middle-stage compressor on the basis of a differential pressure between a pressure of a region closer to the middle-stage compressor than to the expander, in the region inside the casing, and a pressure of a region closer to the expander than to the middle-stage compressor in the region.

According to the above method (11), it is possible to predict the amount of refrigerant that leaks from the middle-stage compressor toward the expander accurately by detecting the pressure difference between the two regions. Thus, it is possible to suppress heat penetration into the expander by extracting the leaking refrigerant from the extraction line on the basis of the above detected pressure difference.

(12) In some embodiments, in the above method (10) or (11), the extraction step includes a second extraction-amount adjustment step of adjusting an extraction amount to the intake side or the discharge side of the middle-stage compressor on the basis of a temperature difference between a temperature of a region closer to the middle-stage compressor than to the expander, in the region inside the casing, and a temperature of a region closer to the expander than to the middle-stage compressor in the region.

According to the above method (12), it is possible to predict the amount of refrigerant that leaks from the middle-stage compressor toward the expander accurately by detecting the temperature difference between the two regions. Thus, it is possible to suppress heat penetration into the expander by extracting the leaking refrigerant from the extraction line on the basis of the above detected temperature difference.

(13) In some embodiments, in any one of the above methods (10) to (12), the extraction step includes a third extraction-amount adjustment step of adjusting an extraction amount from the region inside the casing to the intake side of the compressor on the basis of at least one of COP of the refrigerator or a refrigerant temperature difference between an intake side and a discharge side of the expander.

According to the above method (13), it is possible to improve COP of the refrigerator by adjusting the extraction amount on the basis of at least one of the refrigerator COP or a refrigerant temperature difference between the intake side and the discharge side of the expander.

(14) In some embodiments, in any one of the above methods (10) to (13), the middle-stage compressor comprises a centrifugal compressor including a compressor impeller fixed to an end of the first motor. The expander comprises a centrifugal expander including a turbine impeller fixed to another end of the first motor. The compression step and the expansion step include adjusting pressures to be substantially the same at a back side of the compressor impeller and at a back side of the turbine impeller.

According to the above method (14), it is possible to suppress leakage of a high-temperature refrigerant from the back-face side of the compressor impeller toward the expander, by equalizing the back-face side pressure of the compressor impeller and the back-face side pressure of the turbine impeller.

Advantageous Effects

According to at least one embodiment of the present invention, it is possible to suppress heat penetration into an expander due to a refrigerant leaking from the compressor side within a casing of an expander-integrated compressor, and thereby it is possible to improve the adiabatic efficiency of the expander and the refrigerating performance (refrigerating ability, COP) of the refrigerator.

DETAILED DESCRIPTION

Figure 1:
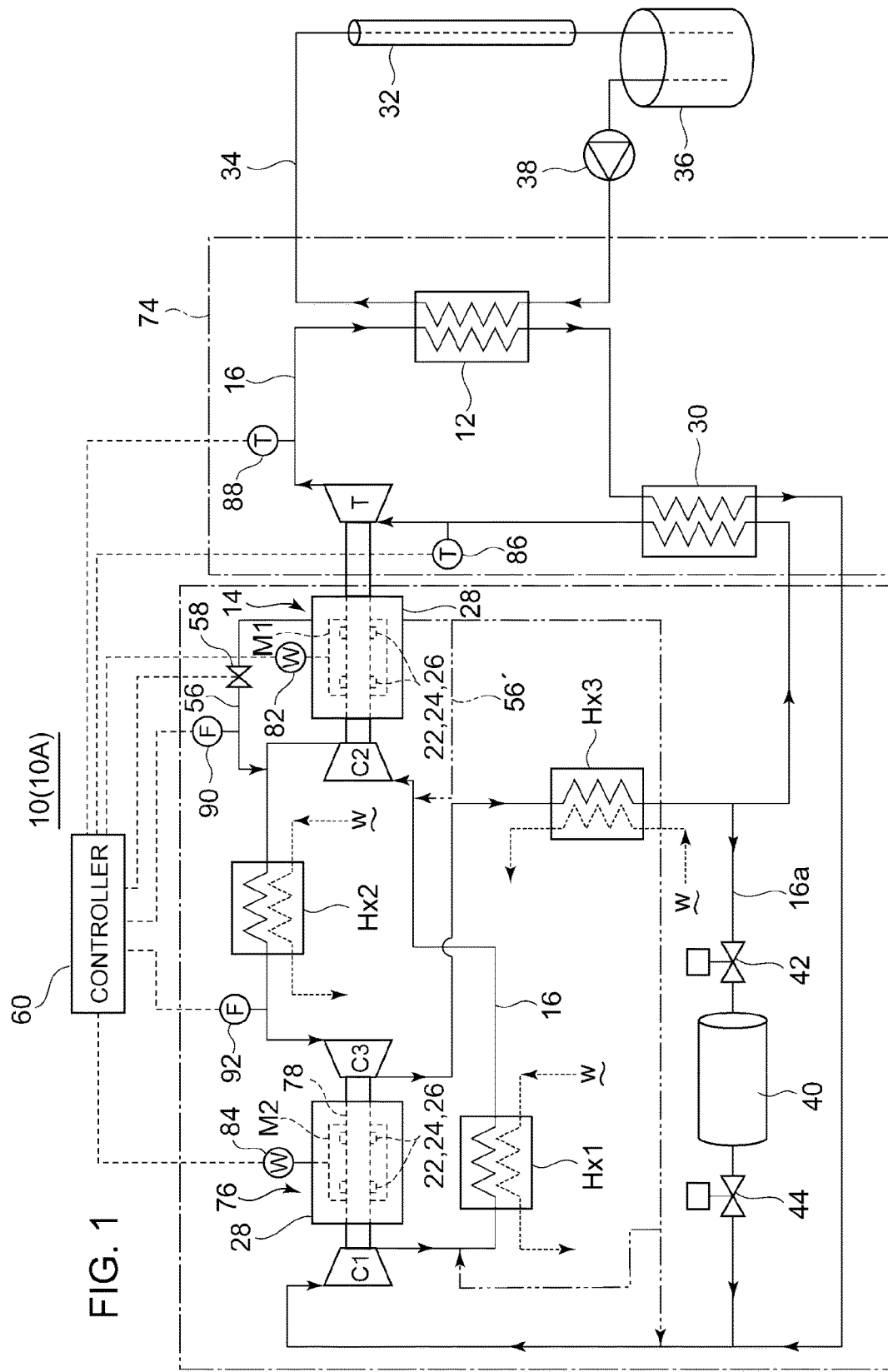
FIG. 1 is a system diagram of a refrigerator according to an embodiment.

With reference to the accompanied drawings, some embodiments of the present embodiments will be described. It is intended, however, that unless particularly specified, dimensions, materials, shapes, relative positions and the like of components described in the embodiments or illustrated in the drawings shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
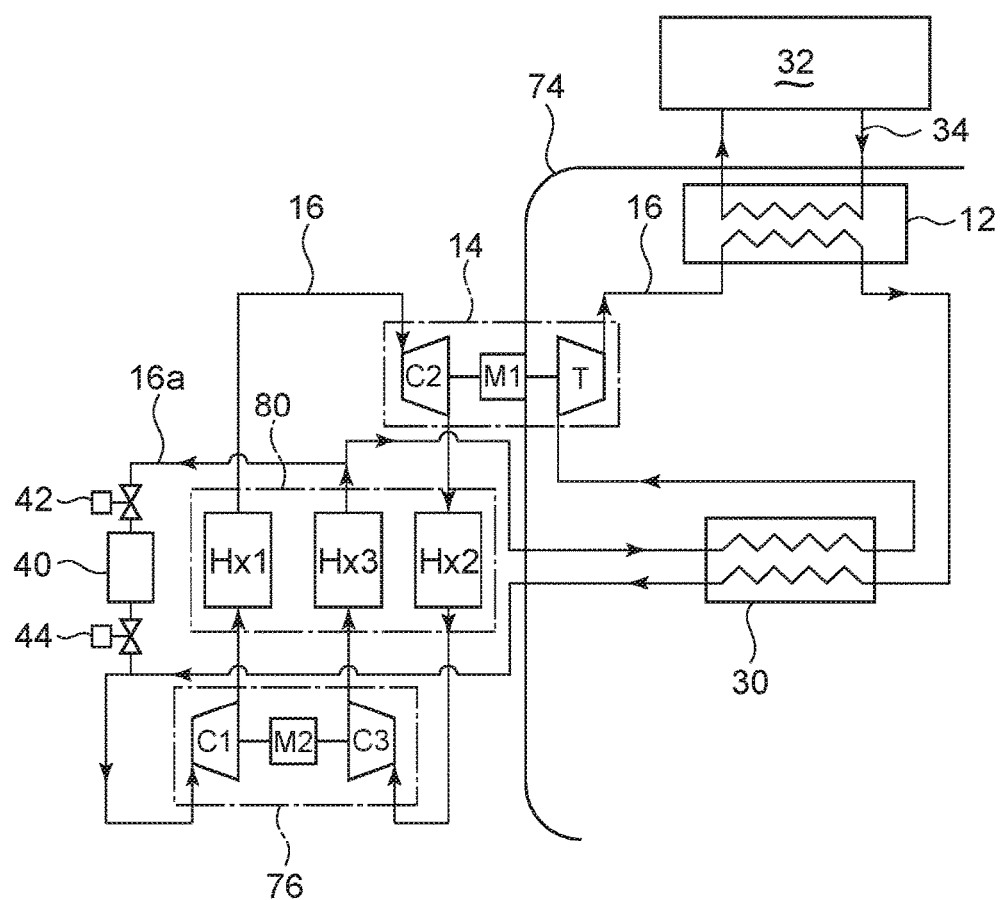
FIG. 2 is a system diagram of a refrigerator according to an embodiment.

FIGS. 1 and 2 are diagrams of a refrigerator 10 (10A, 10B) according to some embodiments.

The refrigerator 10 (10A, 10B) includes a cooling part 12 that cools an object to be cooled through heat exchange with a refrigerant, an expander-integrated compressor 14, and a refrigerant circulation line 16.

The expander-integrated compressor 14 includes a middle-stage compressor C2 for compressing the refrigerant, and an expander T for expanding the refrigerant, which are integrated into the expander-integrated compressor 14. A refrigerant circulation line 16 is configured to circulate the refrigerant through the compressors C1, C2, C3, the expander T, and the cooling part 12.

The compressors provided for the refrigerator 10 (10A, 10B) include a low-stage compressor C1, a middle-stage compressor C2, and a high-stage compressor C3 which are disposed in series in the refrigerant circulation line 16.

Figure 3:
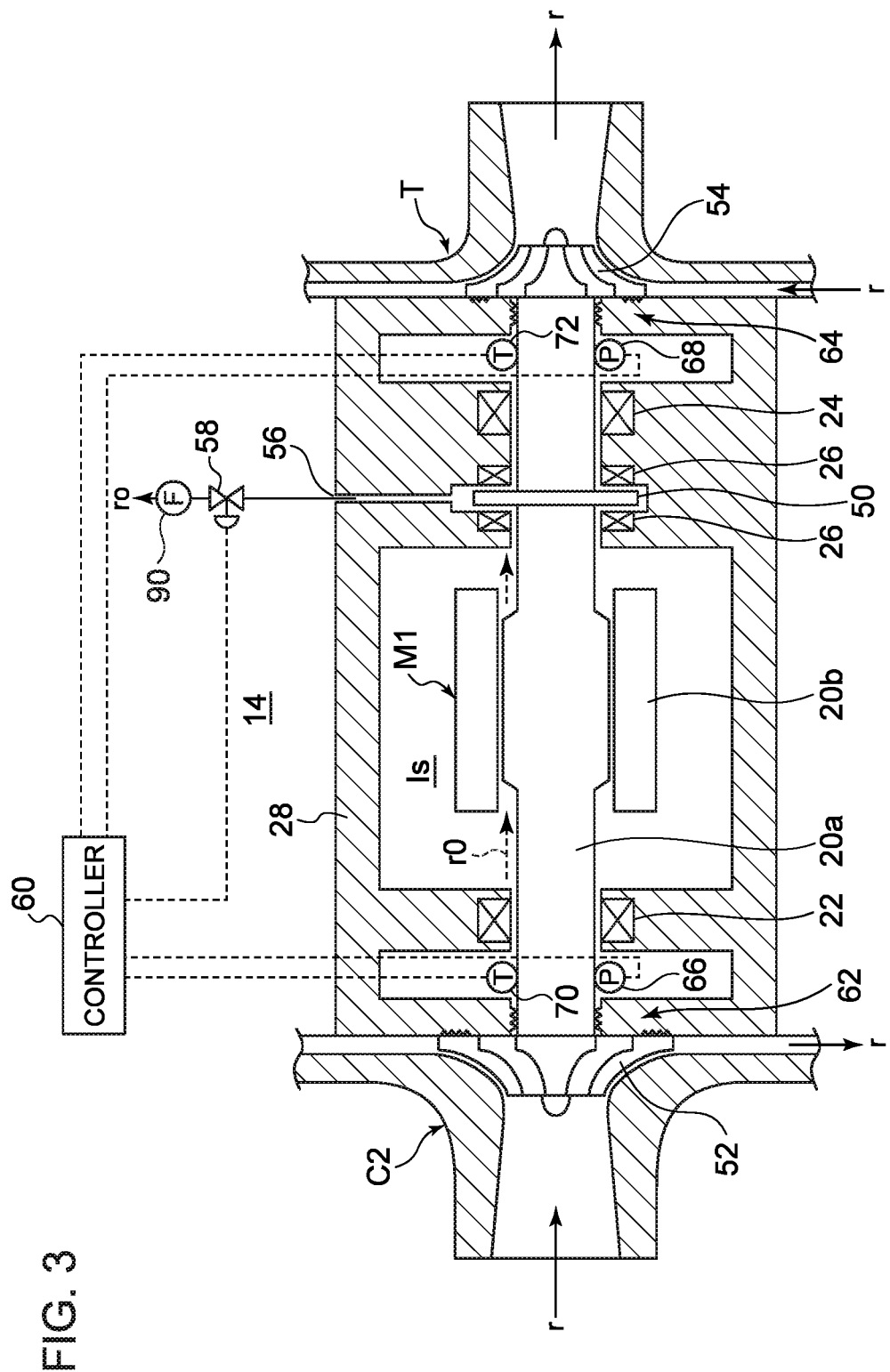
FIG. 3 is a vertical cross-sectional view of an expander-integrated compressor according to an embodiment.

As depicted in FIG. 3, the expander-integrated compressor 14 according to at least one embodiment includes: the middle-stage compressor C2; the expander T; the first motor M1; at least one non-contact type bearings 22, 24, 26; and a casing 28 that houses the middle-stage compressor C2, the expander T, and the at least one non-contact bearings.

The expander T adiabatically expands and cools a refrigerant discharged from the high-stage compressor C3. An output shaft 20a of the first motor M1 is connected to the middle-stage compressor C2 and to the expander T. The at least one non-contact bearings 22, 24, 26 are disposed between the high-stage compressor C3 and the expander T, and support the output shaft 20a without making contact with the output shaft 20a.

In the depicted embodiment, the middle-stage compressor C2 and the expander T are disposed on either end portion of the output shaft 20a.

The middle-stage compressor C2 and the expander T are driven by the first motor M1. The middle-stage compressor C2 is configured to compress the refrigerant r, and the expander T expands the refrigerant r. The pressure energy of the refrigerant r is utilized as an assist power for the middle-stage compressor C2, and thereby it is possible to reduce the power of the first motor M1.

In the refrigerator 10 (10A, 10B) depicted in FIGS. 1 and 2, the refrigerant circulates through the refrigerant circulation line 16.

As an exemplary embodiment of the refrigerator 10 (10A, 10B), the first heat exchanger Hx1 is disposed in the refrigerant circulation line 16 between the low-stage compressor C1 and the middle-stage compressor C2, to cool the refrigerant discharged from the low-stage compressor C1.

Further, the second heat exchanger Hx2 is disposed in the refrigerant circulation line 16 between the middle-stage compressor C2 and the high-stage compressor C3, to cool the refrigerant discharged from the middle-stage compressor C2.

Further, the third heat exchanger Hx3 is disposed in the refrigerant circulation line 16 between the high-stage compressor C3 and the expander T, to cool the refrigerant discharged from the high-stage compressor C3.

The refrigerant compressed single-stage by the low-stage compressor C1 is cooled by the first heat exchanger Hx1, and is sent to the middle-stage compressor C2 to be further compressed by the middle-stage compressor C2. The refrigerant compressed by the middle-stage compressor C2 is cooled by the second heat exchanger Hx2, and is compressed by the high-stage compressor C3. The refrigerant compressed by the high-stage compressor C3 is cooled by the third heat exchanger Hx3, and is further cooled by a cold recovery heat exchanger 30, before being sent to the expander T. The refrigerant rotates the expander T, and the pressure energy of the refrigerant is utilized as an assist power for the middle-stage compressor C2, the refrigerant itself expanding to decrease in pressure and temperature.

The low-pressure and low-temperature refrigerant is sent to the cooling part 12. The cooling part 12 includes a heat exchanger, for instance, and cools an object to be cooled with the refrigerant. Then, the refrigerant is sent to the cold recovery heat exchanger 30 to cool a refrigerant to be sent to the expander T, and returns to the low-stage compressor C1.

In an exemplary embodiment, an object to be cooled through heat exchange with the refrigerant at the cooling part 12 is liquid nitrogen for cooling a superconductive device 32 such as a superconductive cable.

In the exemplary embodiment depicted in FIG. 1, a liquid-nitrogen circulation line 34 is disposed to circulate through the cooling part 12, the superconductive device 32 and a reservoir tank 36. A liquid-nitrogen pump 38 is disposed in the liquid-nitrogen circulation line 34, and liquid nitrogen cooled to an extremely low temperature at the cooling part 12 is circulated to the superconductive device 32.

In this case, the superconductive device 32 enters a superconductive state, and thus needs to be cooled at an extremely low temperature. Thus, the refrigerant is at an extremely low temperature at the discharge side of the expander T, and thus there is a great temperature difference between the discharge side of the middle-stage compressor C2 and the discharge side of the expander 18, within the refrigerant circulation line 16.

For instance, in an embodiment, while the temperature is approximately 30 to 40° C. at the intake side of the middle-stage compressor C2 and approximately 90 to 100° C. at the discharge side, the temperature is approximately minus 190 to minus 200° C. at the intake side and approximately minus 210° C. to minus 220° C. at the discharge side of the expander 18.

Accordingly, if the refrigerant leaks from the side of the middle-stage compressor C2 toward the expander 18, the refrigerating performance of the refrigerator 10 (10A, 10B) decreases.

Further, a refrigerant that flows through the refrigerant circulation line 16 may be selected in accordance with a target cooling temperature of the object to be cooled, for instance, from among helium, neon, hydrogen, nitrogen, air, hydrocarbon, or the like, for instance.

In an exemplary embodiment, as depicted in FIGS. 1 and 2, a bypass line 16a is connected to the refrigerant circulation line 16 at the outlet side of the third heat exchanger Hx3 and at the inlet side of the low-stage compressor C1. A buffer tank 40 capable of storing the refrigerant temporarily is disposed in the bypass line 16a. Open-close valves 42 and 44 are disposed upstream and downstream of the buffer tank 40.

It is possible to adjust the amount of refrigerant that circulates through the refrigerant circulation line 16 by storing the refrigerant in the buffer tank 40 temporarily.

Further, the first heat exchanger Hx1, the second heat exchanger Hx2, and the third heat exchanger Hx3 are supplied with coolant water w, for instance, as a cooling medium for cooling the refrigerant.

In an exemplary embodiment of the expander-integrated compressor 14, as depicted in FIG. 3, the output shaft 20a of the first motor 20 is supported without contact by radial magnetic bearings 22, 24 and a thrust magnetic bearing 26 disposed between the middle-stage compressor C2 and the expander T. The radial magnetic bearings 22 and 24 are disposed on either side of the first motor M1, so as to levitate the output shaft 20a with a magnetic force and to support the radial load of the output shaft 20a. The thrust magnetic bearing 26 is disposed between the first motor M1 and the expander T to support the thrust load of the output shaft 20a with a magnetic force so that a gap is formed between the thrust magnetic bearing 26 and a rotor disc 50 disposed on the output shaft 20a.

In an exemplary embodiment, the middle-stage compressor C2 is a centrifugal compressor including a compressor impeller 52 fixed to an end of the first motor M1, and the expander T is a centrifugal expander including a turbine impeller 54 fixed to the other end of the first motor M1. The compressor impeller 52 and the turbine rotor 54 are both disposed in the flow path of the refrigerant r. A stator 20b is disposed around the output shaft 20a.

As depicted in FIG. 3, in an exemplary embodiment, an extraction line 56 (56') is formed through the expander-integrated compressor 14.

The extraction line 56 (or 56') is disposed so as to communicate with a region "Is" of the interior space of the casing 28, which is disposed between the middle-stage compressor C2 and the expander T. Through the extraction line 56 (56'), at least a part of the leaking refrigerant r0 flowing from the side of the middle-stage compressor C2 toward the expander T inside the casing 28 is extracted from the region "Is" to the refrigerant circulation line 16 connected to the intake side or the discharge side of the middle-stage compressor C2 outside the casing 28.

Further, the casing 28 is configured so as to seal the region "Is" from the outside of the casing 28 so that at least a part of the flow of the leaking refrigerant r via the extraction line 56 is the only flow between the region "Is" and the outside of the casing 28.

In an exemplary embodiment, as depicted in FIG. 3, disposed inside the casing 28 are a seal portion 62 for restricting leakage of the refrigerant r from the middle-stage compressor C2 into the casing, and a seal portion 64 for restricting leakage of the refrigerant r from the expander T into the casing 28.

The seal portions 62 and 64 may be labyrinth seals. In this case, as depicted in FIG. 3, the labyrinth seals may be disposed on the back side of the compressor impeller 52 or of the turbine impeller 54, between the casing 28 and the compressor impeller 52 or the turbine impeller 54, and around the output shaft 20a and between the output shaft 20a and the casing 28.

If a pressure difference becomes greater between the middle-stage compressor side and the expander side within the region "Is", the seal portions 62 and 64 may fail to completely prevent leakage of the refrigerant from the side of the middle-stage compressor into the casing. After entering the region "Is", the leaking refrigerant r0 passes through the gap between the output shaft 20a and the non-contact type bearings 22, 24, and 26, and leaks to the expander side where the operating temperature is lower than at the middle-stage compressor side. Accordingly, heat penetrates into the expander T, and the adiabatic efficiency of the expander may deteriorate.

Thus, the leaking refrigerant r0 is discharged to the refrigerant circulation line 16 on the intake side or the discharge side of the middle-stage compressor C2, or to the refrigerant circulation line 16 on the intake side or the discharge side of the low-stage compressor C1 through the extraction line 56 (56'), thereby suppressing heat penetration toward the expander.

In the exemplary embodiment depicted in FIG. 3, the extraction line 56 (56') extends in the radial direction so as to penetrate through the casing 28. The axial directional position of the extraction line 56 (56') is not particularly limited, and may be disposed along the axial direction of the output shaft 20a.

In an exemplary embodiment, as depicted in FIG. 3, a pressure gauge is further provided to detect a differential pressure between a pressure of a region of the region "Is" closer to the middle-stage compressor C2 than to the expander T and a pressure of a region of the region "Is"

closer to the expander T than to the middle-stage compressor C2. The presence or absence and the amount of the leaking refrigerant r0 are predicted on the basis of the differential pressure detected by the pressure gauge.

In the depicted embodiment, a pressure gauge 66 is provided to detect a pressure of a region of the region "Is" closer to the middle-stage compressor C2 than to the expander T, and a pressure gauge 68 is provided to detect a pressure of a region of the region "Is" closer to the expander T than to the middle-stage compressor C2. The detection values of the pressure gauges are input to the controller 60, which obtains a differential pressure therebetween, and the presence or absence and the amount of the leaking refrigerant r0 are predicted on the basis of the differential pressure.

In an exemplary embodiment, as depicted in FIG. 3, a thermometer is further provided to detect a temperature difference between a temperature of a region of the region "Is" closer to the middle-stage compressor C2 than to the expander T and a temperature of a region of the region "Is" closer to the expander T than to the middle-stage compressor C2.

In the depicted embodiment, a thermometer 70 is provided to detect a temperature of a region of the region "Is" closer to the middle-stage compressor C2 than to the expander T, and a thermometer 72 is provided to detect a temperature of a region of the region "Is" closer to the expander T than to the middle-stage compressor C2. The detection values of the thermometers are input to the controller 60, which obtains a temperature difference therebetween, and the presence or absence and the amount of the leaking refrigerant r0 are predicted on the basis of the temperature difference.

In the embodiment depicted in FIG. 3, both of the pressure gauges 66, 68 and the thermometers 70, 72 are provided. However, the expander-integrated compressor 14 may include either the pressure sensors or the thermometers.

In an exemplary embodiment, as depicted in FIGS. 1 and 3, the expander-integrated compressor 14 further includes an extraction valve 58, disposed in the extraction line 56, for adjusting the extraction amount of the leaking refrigerant r0.

In an exemplary embodiment, as depicted in FIG. 3, a controller 60 is further provided to control the opening degree of the extraction valve 58 on the basis of the detection values of the pressure gauges 66 and 68 and of the thermometers 70 and 72. Accordingly, it is possible to control the extraction amount of the leaking refrigerant r0 on the basis of the presence or absence and the amount of the leaking refrigerant r0.

In an exemplary embodiment, as depicted in FIGS. 1 and 2, the expander T and the cooling part 12 are housed in an adiabatic housing 74 that is thermally insulated from outside.

In the depicted embodiment, the cold recovery heat exchanger 30 is also housed inside the sealed housing 74.

In an exemplary embodiment, as depicted in FIG. 1, a compressor unit 76 is provided, which includes the low-stage compressor C1, the high-stage compressor C3, the second motor M2, the at least one non-contact type bearings 22, 24, and 26, and the casing 28 for housing these devices.

The output shaft 78 of the second motor M2 is connected to the low-stage compressor C1 and the high-stage compressor C3, and the at least one non-contact type bearings 22, 24, and 26 comprise, for instance, radial magnetic bearings and a thrust magnetic bearing that support the output shaft 78 without making contact.

The casing 28 and the non-contact type bearings 22, 24, 26 for the compressor unit 76 may have the same configuration as the casing 28 and the non-contact type bearings 22, 24, 26 for the expander-integrated compressor 14, or may not necessarily have the same configuration.

In an exemplary embodiment, as depicted in FIG. 2, the first heat exchanger Hx1, the second heat exchanger Hx2, and the third heat exchanger Hx3 are disposed between the expander-integrated compressor 14 and the compressor unit 76, so as to be parallel in the longitudinal direction, thus forming a heat exchanger unit 80, for instance.

In an exemplary embodiment, as depicted in FIG. 1, the controller 60 is configured to control the opening degree of the extraction valve 58 on the basis of at least one of COP of the refrigerator 10 (10A) or the refrigerant temperature difference between the intake side and the discharge side of the expander T.

The refrigerator COP can be calculated by measuring the power (power consumption) of the first motor M1 and of the second motor M2, for instance. In this case, the power is measured by dynamometers 82 and 84, and the measurement results are sent to the controller 60.

The temperatures of the intake side and the discharge side of the expander T are measured by the thermometer 86 disposed on the intake side of the expander T and the thermometer 88 disposed on the discharge side of the expander T, in the refrigerant circulation line 22, and the measurement results are sent to the controller 60. The controller 60 calculates the refrigerant temperature difference between the intake side and the discharge side of the expander T from the temperatures measured by the thermometers 86 and 88.

Further, a flow meter 90 is disposed in the extraction line 56 (56'), and detects the extraction amount of leaking refrigerant extracted to the refrigerant circulation line 16 connected to the intake side or the discharge side of the middle-stage compressor C2 outside the casing from the region "Is". The detection results are sent to the controller 60.

Further, the flow meter 92 disposed in the refrigerant circulation line 16 detects the amount of refrigerant circulation.

In an exemplary embodiment, the controller 60 is configured to adjust the extraction amount from the region "Is" inside the casing of the expander-integrated compressor 14 to the intake side of the middle-stage compressor C2, on the basis of measurements on the flow rate of leaking refrigerant in the extraction line 56, the power of the first motor M1 and the second motor M2, the COP of the refrigerator 10 (10A), the refrigerant temperature difference between the intake side and the discharge side of the expander T, or the like. Further, the refrigerator COP can be obtained from the power consumption standard COP ($COP_b$) obtained by the above expression (1), or from the compression power standard COP ($COP_c$) obtained by the above expression (2).

In the above expressions (1) and (2), G is the mass flow rate [kg/s] of refrigerant that circulates through the refrigerant circulation line 16; P is the sum of power (power consumption) [W] of the first motor M1 and the second motor M2; $h_1$ is the sum of inlet enthalpy [J/kg] of the low-stage compressor C1, the middle-stage compressor C2, and the high-stage compressor C3; $h_2$ is the sum of outlet enthalpy [J/kg] of the low-stage compressor C1, the middle-stage compressor C2, and the high-stage compressor C3; $h_5$ is the inlet enthalpy [J/kg] of the heat exchanger for the cooling part 12; and $h_6$ is the outlet enthalpy [J/kg] of the heat exchanger for the cooling part 12.

In an exemplary embodiment, the controller 60 includes a memory that stores information on operational conditions for the refrigerator 10 (10A) including at least one of a target refrigerator COP or the temperature difference between the intake side and the discharge side of the expander T, and adjusts the extraction amount by controlling the opening degree of the extraction valve 58 so as to satisfy the above operational conditions, on the basis of the detection result of at least one of the refrigerator COP calculated by the dynamometers 82, 84 or the like (hereinafter, also referred to as "measurement refrigerator COP") or of the thermometers 86, 88.

The controller 60 may determine the opening-degree command value of the extraction valve 58 on the basis of a difference between information that indicates the operational conditions of the refrigerator 10 (10A) stored in the memory and the detection result of at least one of the measurement refrigerator COP or of the thermometers 86, 88. In this case, the controller 60 may include a P controller, a PI controller, a PID controller, or the like, for determining the opening-degree command value for the extraction valve 58.

Further, the operational conditions of the refrigerator 10 (10A) that maximizes the COP may vary in accordance with the cooling loads of the cooling part 12. In this case, the controller 60 may adjust the extraction amount on the basis of the detection result of at least one of the measurement refrigerator COP or of the thermometers 86, 88, so as to satisfy the operational conditions corresponding to the cooling loads of the cooling part 12.

The enthalpies $h_1$, $h_2$, $h_5$, and $h_6$ are respectively obtained from the measurement values of the pressures $P_1$, $P_2$, $P_5$, and $P_6$, and the temperatures $T_1$, $T_2$, $T_5$, and $T_6$, at respective points. Further, the refrigerator 10 (10A) may include a flow meter (not depicted) for measuring the mass flow rate of refrigerant that circulates through the refrigerant circulation line 16, or thermometers (not depicted) and pressure gauges (not depicted) for measuring temperatures and pressures, respectively, of the inlet and the outlet of each compressor and of the inlet and the outlet of the cooling part 12.

In another embodiment, the controller 60 includes a memory storing information on at least one of the target refrigerator COP or the maximum value of the temperature difference between the intake side and the discharge side of the expander T, and adjusts the extraction amount by controlling the opening degree of the extraction valve 58 so that the detection result of at least one of the measurement refrigerator COP or the thermometers 86, 88 gets closer to the target refrigerator COP or the maximum value of the temperature difference between the intake side and the discharge side of the expander T. The controller 60 may determine the opening-degree command value of the extraction valve 58 on the basis of the difference between the target refrigerator COP stored in the memory or information that indicates the maximum value of the temperature difference between the intake side and the discharge side of the expander T and the detection result of at least one of the measurement refrigerator COP or the thermometers 86, 88. In this case, the controller 60 may include a P controller, a PI controller, a PID controller, or the like, for determining the opening-degree command value for the extraction valve 58.

In an exemplary embodiment, the controller 60 is configured to adjust the extraction amount from the region "Is" inside the casing to the intake side or the discharge side of the middle-stage compressor C2, so as not to exceed the upper limit of the extraction amount determined so as not to exceed the tolerance of the loads (thrust loads) of the thrust magnetic bearing 26.

Figure 4:
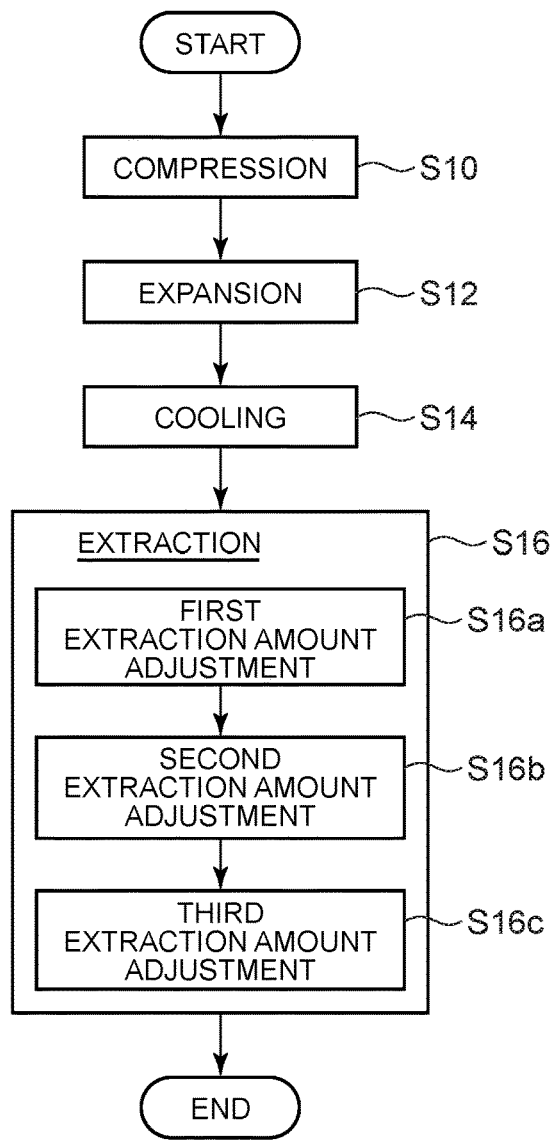
FIG. 4 is a flowchart of a method of operating a refrigerator according to an embodiment.

As depicted in FIG. 4, a method of operating a refrigerator according to at least one embodiment includes a compression step S10, an expansion step S12, a cooling step S14, and an extraction step S16.

In the compression step S10, the low-stage compressor C1, the middle-stage compressor C2, and the high-stage compressor C3 compress the refrigerant.

In the expansion step S12, the expander T expands the refrigerant compressed in the compression step S10.

In the cooling step S14, an object to be cooled is cooled at the cooling part 12 through heat exchange with a refrigerant expanded by the expander T2.

In the extraction step S16, through the extraction line 56 (56') disposed so as to communicate with the region "Is" inside the casing of the expander-integrated compressor 14, at least a part of the leaking refrigerant r0 flowing from the middle-stage compressor C2 toward the expander T is extracted from the region "Is" inside the casing to the refrigerant circulation line 16 connected to the intake side or the discharge side of the middle-stage compressor C2 outside the casing.

In an exemplary embodiment, as depicted in FIG. 4, the extraction step S16 includes a first extraction-amount adjustment step S16a of adjusting the extraction amount to the intake side or the discharge side of the middle-stage compressor C2 on the basis of the pressure difference between the pressure of a region closer to the middle-stage compressor 16 than to the expander T, of the region "Is" inside the casing of the expander-integrated compressor 14, and the pressure of a region closer to the expander T than to the middle-stage compressor 16, of the region "Is".

The pressures of the above two regions are detected by the pressure gauges 66 and 68 depicted in FIG. 3, for instance.

In an exemplary embodiment, as depicted in FIG. 4, the extraction step S16 includes a second extraction-amount adjustment step S16b of adjusting the extraction amount to the intake side or the discharge side of the middle-stage compressor C2 on the basis of the temperature difference between the temperature of a region closer to the middle-stage compressor 16 than to the expander T, of the region "Is" inside the casing of the expander-integrated compressor 14, and the temperature of a region closer to the expander T than to the middle-stage compressor 16, of the region "Is".

The temperatures of the above two regions are detected by thermometers 70 and 72 depicted in FIG. 3, for instance.

In an exemplary embodiment, as depicted in FIG. 4, the extraction step S16 includes a third extraction-amount adjustment step S16c of adjusting the extraction amount from the region "Is" inside the casing of the expander-integrated compressor 14 to the intake side or the discharge side of the middle-stage compressor C2, on the basis of at least one of the COP of the refrigerator 10 (10A) or the refrigerant temperature difference between the intake side and the discharge side of the expander T.

From the above three steps including the first extraction-amount adjustment step S16a, the second extraction-amount adjustment step S16b, and the third extraction-amount adjustment step S16c, at least one of the steps may be performed, or two or more steps may be performed together. Further, the order to perform the steps S16a to S16c is not limited to the one shown in the drawing.

In an exemplary embodiment, as depicted in FIG. 3, the middle-stage compressor 16 is a centrifugal compressor including a compressor impeller 52 fixed to an end of the first motor M1, and the expander T is a centrifugal expander including a turbine impeller 54 fixed to the other end of the first motor M1.

In the compression step S10 and the expansion step S12, the pressures are adjusted to be substantially the same at the back side of the compressor impeller 52 and at the back side of the turbine impeller 54.

In some embodiments, as depicted in FIGS. 1 and 2, the middle-stage compressor C2 and the expander T are integrated into the expander-integrated compressor 14, and thereby it is possible to reduce or substantially eliminate the pressure difference between the outlet static pressure of the middle-stage compressor C2 and the inlet static pressure of the expander T during normal operation. Accordingly, it is possible to restrict the amount of refrigerant that leaks from the middle-stage compressor C2 to the expander T, thus suppressing heat penetration, and to suppress deterioration of the adiabatic efficiency of the expander T and of the refrigerating performance of the refrigerator 10 (10A, 10B).

In the exemplary embodiment, as depicted in FIGS. 1 and 3, in case the refrigerant is still leaking from the middle-stage compressor C2 to the expander T side, at least a part of the leaking refrigerant r0 is extracted outside the casing from the region "Is" through the extraction line 56 (56'), and thereby it is possible to further reduce the amount of refrigerant that flows into the expander side.

In an exemplary embodiment, as depicted in FIG. 1, it is possible to predict the presence or absence and the amount of leakage of the leaking refrigerant r0 by detecting the difference in pressures or temperatures between the middle-stage compressor side and the expander side, within the region "Is". It is possible to suppress heat penetration into the expander T by controlling operation of the refrigerator 10 (10A) or by adjusting the extraction amount through the extraction line 56 (56'), on the basis of the prediction.

In an exemplary embodiment, as depicted in FIGS. 1 and 3, the extraction valve 58 is disposed in the extraction line 56 (56'), and the controller 60 for controlling the opening degree of the extraction valve 58 on the basis of the pressure difference or the temperature difference is provided, and thereby it is possible to suppress heat penetration into the expander T efficiently.

In an exemplary embodiment, as depicted in FIG. 1, the controller 60 controls the opening degree of the extraction valve 58 on the basis of at least one of COP of the refrigerator 10 (10A) or the refrigerant temperature difference between the intake side and the discharge side of the expander T, and thereby it is possible to control the extraction amount to such a value that maximizes COP in accordance with the operational conditions, and thereby to improve COP of the refrigerator 10 (10A).

In an exemplary embodiment, the expander T and the cooling part 12, as well as the cold recovery heat exchanger 30, is housed in the adiabatic housing 74, and thereby it is possible to suppress deterioration of the adiabatic efficiency of the expander T and of the refrigerating performance of the refrigerator 10 (10A) due to heat penetration from outside.

In an exemplary embodiment, the compressor unit 76 includes the low-stage compressor C1 and the high-stage compressor C3 integrated therein, and thereby it is possible to provide the refrigerator 10 (10A, 10B) with a simple configuration and at low costs. Further, it is possible to drive the low-stage compressor C1 and the high-stage compressor C3 with one motor, and thus it is possible to reduce the power required for driving the compressors as compared to a case in which the low-stage compressor C1 and the high-stage compressor C3 are driven independently.

In an exemplary embodiment, as depicted in FIG. 2, the first heat exchanger Hx1, the second heat exchanger Hx2, and the third heat exchanger Hx3 are disposed so as to be parallel in the longitudinal direction, and thus it is possible to reduce the installation space for the heat exchangers.

Further, the heat exchangers are unitized to form the heat exchanger unit 80 disposed between the expander-integrated compressor 14 and the compressor unit 76, and thereby it is possible to facilitate installation of the piping to be connected between the heat exchangers, and to reduce the length and thus costs of the piping. Further, reducing the length of the piping makes it possible to reduce pressure loss of refrigerant that flows through the piping, and thus to improve the refrigerating performance of the refrigerator 10 (10A, 10B).

Further, it is possible to provide the buffer tank 40 while saving space, and the piping can be attached more easily.

Figure 6:
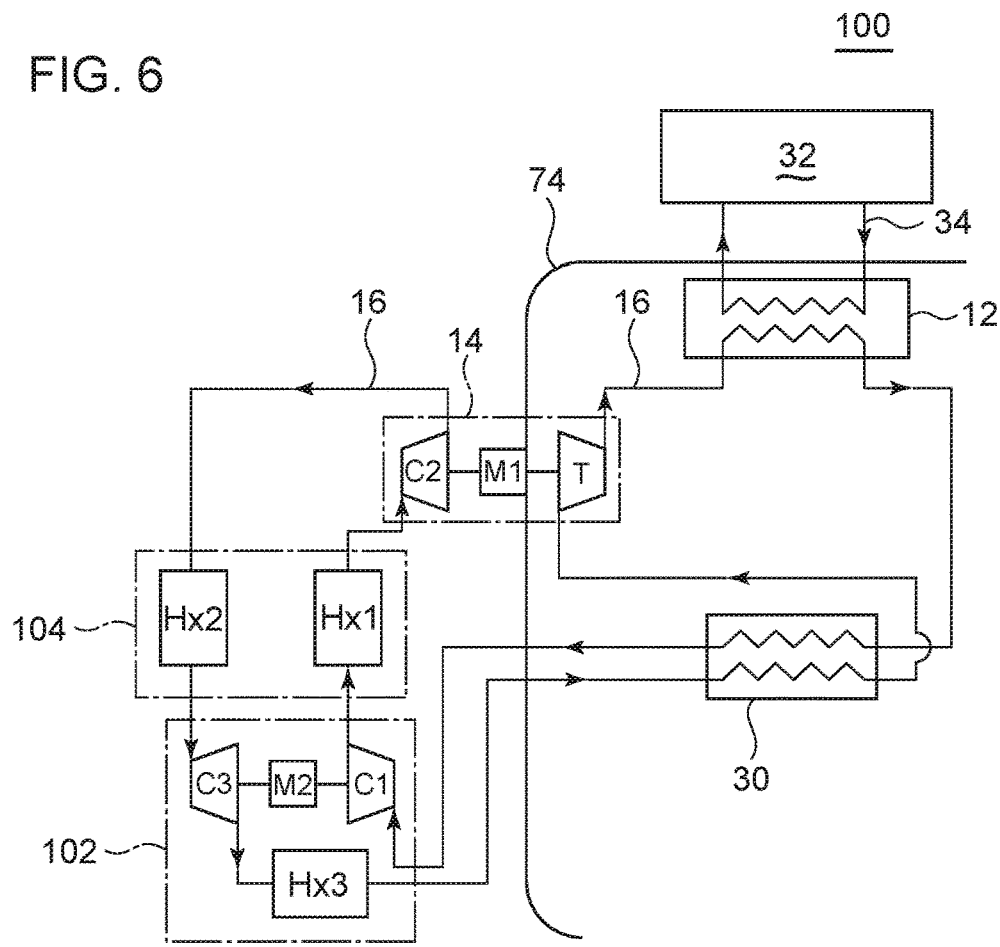
FIG. 6 is a system diagram of a refrigerator according to a comparative example.

FIG. 6 is a diagram of the device arrangement of a refrigerator 100 of a comparative example. In the refrigerator 100, the third heat exchanger Hx3 forms a unit 102 with the compressor unit 76, and the heat exchanger unit 104 includes only the first heat exchanger Hx1 and the second heat exchanger Hx2.

In the refrigerator 100, the compressor unit 102 occupies a greater space, and the installation space of the heat exchanger unit 104 cannot be reduced. Further, the devices are connected by piping of a greater length, which may increase the pressure loss of refrigerant that flows through the piping and deteriorate the performance of the refrigerator 100.

Figure 7:
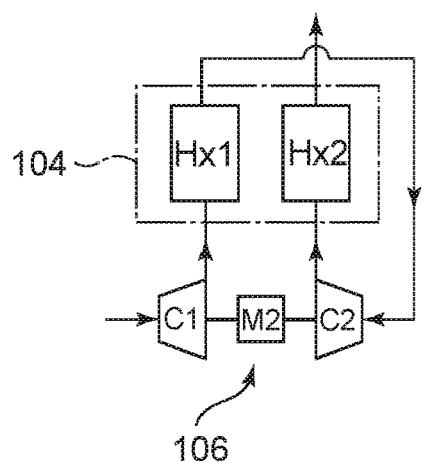
FIG. 7 is a system diagram of a refrigerator according to a comparative example.

Further, as depicted in FIG. 7, for the low-stage compressor C1 and the middle-stage compressor C2 integrated into the compressor unit 106, a longer length of piping needs to be installed than for the refrigerator 100, to connect the low-stage compressor C1 and the middle-stage compressor C2 to the first heat exchanger Hx1 and the second heat exchanger Hx2 with piping. Further, a greater space is required to install the piping and the length of the piping increases, which may increase the pressure loss of refrigerant that flows through the piping and deteriorate the performance of the refrigerator 100.

Figure 5:
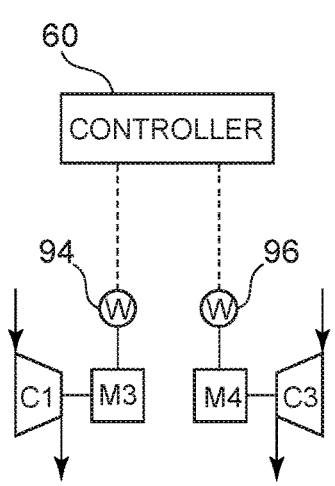
FIG. 5 is a system diagram of a part of a refrigerator according to an embodiment.

FIG. 5 is a configuration diagram of the low-stage compressor C1 and the high-stage compressor C3 according to an embodiment of the present invention. In the present embodiment, the low-stage compressor C1 and the high-stage compressor C3 are equipped with respective dedicated motors M3 and M4. The motors M3 and M4 include respective dynamometers 94 and 96, and the detection values of the dynamometers are input into the controller 60. The configuration of the present embodiment is otherwise the same as that of the above embodiment in FIG. 1.

According to the present embodiment, the low-stage compressor C1 and the high-stage compressor C3 can be driven at respective unique motor rotation speeds, and thereby can be operated at the optimum operational conditions for each compressor.

INDUSTRIAL APPLICABILITY

According to at least one embodiment of the present invention, it is possible to provide a Brayton-cycle refrigerator provided with an expander-integrated compressor, whereby it is possible to suppress leakage of refrigerant from a compressor toward an expander, and thereby to suppress deterioration of the adiabatic efficiency of the expander and of the refrigerating performance of the refrigerator.

The invention claimed is:

1. A refrigerator, comprising:
a cooling part for cooling an object to be cooled through heat exchange with a refrigerant;
an expander-integrated compressor including a compressor for compressing the refrigerant and an expander for expanding the refrigerant, the compressor and the expander integrated into the expander-integrated compressor; and
a refrigerant circulation line configured to circulate the refrigerant through the compressor, the expander, and the cooling part,
wherein the compressor includes a low-stage compressor, a middle-stage compressor, and a high-stage compressor disposed in series in the refrigerant circulation line,
wherein the expander-integrated compressor includes:
the middle-stage compressor;
the expander for adiabatically expanding and cooling the refrigerant discharged from the high-stage compressor;
a first motor having an output shaft connected to the middle-stage compressor and to the expander;
at least one non-contact type bearing, disposed between the middle-stage compressor and the expander, for supporting the output shaft of the first motor without being in contact with the output shaft; and
a casing for housing the middle-stage compressor, the expander, and the at least one non-contact type bearing.

2. The refrigerator according to claim 1, further comprising an extraction line disposed so as to communicate with a region between the middle-stage compressor and the expander in an interior space of the casing, and configured to extract at least a part of leaking refrigerant which flows from a side of the middle-stage compressor toward the expander inside the casing from the region to the refrigerant circulation line connected to an intake side or a discharge side of the middle-stage compressor outside the casing,
wherein the casing is configured to seal the region from outside of the casing so that at least a part of the leaking refrigerant via the extraction line is the only flow of the refrigerant between the region and the outside of the casing.

3. The refrigerator according to claim 2, further comprising a pressure meter for detecting a differential pressure between a pressure of a region closer to the middle-stage compressor than to the expander, in the region of the interior space of the casing, and a pressure of a region closer to the expander than to the middle-stage compressor in the region,
wherein a presence or absence of the leaking refrigerant is detected from a detection value of the pressure meter.

4. The refrigerator according to claim 3, further comprising:
an extraction valve, disposed in the extraction line, for adjusting an extraction amount of the leaking refrigerant; and
a controller for controlling an opening degree of the extraction valve on the basis of the detection value of the pressure meter.

5. The refrigerator according to claim 4,
wherein the controller is configured to control the opening degree of the extraction valve on the basis of at least one of: COP of the refrigerator; or a refrigerant temperature difference between an intake side and a discharge side of the expander.

6. The refrigerator according to claim 2, further comprising a thermometer for detecting a temperature difference between a temperature of a region closer to the middle-stage compressor than to the expander in the region of the interior space of the casing, and a temperature of a region closer to the expander than to the middle-stage compressor in the region,
wherein a presence or absence of the leaking refrigerant is detected from a detection value of the thermometer.

7. The refrigerator according to claim 6, further comprising:
an extraction valve, disposed in the extraction line, for adjusting an extraction amount of the leaking refrigerant; and
a controller for controlling an opening degree of the extraction valve on the basis of the detection value of the thermometer.

8. The refrigerator according to claim 7,
wherein the controller is configured to control the opening degree of the extraction valve on the basis of at least one of: COP of the refrigerator; or a refrigerant temperature difference between an intake side and a discharge side of the expander.

9. The refrigerator according to claim 1, further comprising an adiabatic housing thermally insulated from outside and accommodating the expander and the cooler cooling part.

10. The refrigerator according to claim 1, further comprising a compressor unit which includes:
a second motor having an output shaft connected to the low-stage compressor and to the high-stage compressor;
at least one non-contact type bearing disposed between the low-stage compressor and the high-stage compressor, for supporting the output shaft of the second motor without being in contact with the output shaft; and
a casing for housing the low-stage compressor, the high-stage compressor, and the at least one non-contact type bearing.

11. The refrigerator according to claim 10, further comprising:
a first heat exchanger disposed in the refrigerant circulation line between the low-stage compressor and the middle-stage compressor, for cooling the refrigerant discharged from the low-stage compressor;
a second heat exchanger disposed in the refrigerant circulation line between the middle-stage compressor and the high-stage compressor, for cooling the refrigerant discharged from the middle-stage compressor; and
a third heat exchanger disposed in the refrigerant circulation line between the high-stage compressor and the expander, for cooling the refrigerant discharged from the high-stage compressor,
wherein the first heat exchanger, the second heat exchanger, and the third heat exchanger are disposed between the expander-integrated compressor and the compressor unit, so as to be parallel with each other in a longitudinal direction.

12. A method of operating a refrigerator which comprises:
a cooling part for cooling an object to be cooled through heat exchange with a refrigerant;
an expander-integrated compressor including a compressor for compressing the refrigerant and an expander for expanding the refrigerant, the compressor and the expander being integrated into the expander-integrated compressor; and
a refrigerant circulation line configured to circulate the refrigerant through the compressor, the expander, and the cooling part, wherein the compressor includes a low-stage compressor, a middle-stage compressor, and a high-stage compressor disposed in series in the refrigerant circulation line, wherein the expander-integrated compressor includes:
the middle-stage compressor;
the expander for adiabatically expanding and cooling the refrigerant discharged from the middle-stage compressor;
a first motor having an output shaft connected to the middle-stage compressor and to the expander;
at least one non-contact type bearing, disposed between the middle-stage compressor and the expander, for supporting the output shaft of the first motor without being in contact with the output shaft; and
a casing for housing the middle-stage compressor, the expander, or the at least one non-contact type bearing, and
wherein the casing is configured to seal a region between the middle-stage compressor and the expander, of an interior space of the casing, from outside of the casing, the method comprising:
a compression step of compressing the refrigerant with the three compressors;
an expansion step of expanding the refrigerant compressed in the compression step with the expander;
a cooling step of cooling the object to be cooled through heat exchange with the refrigerant expanded in the expansion step; and
an extraction step of extracting, through an extraction line disposed so as to communicate with the region inside the casing, at least a part of leaking refrigerant which flows from a side of the middle-stage compressor toward the expander inside the casing, from the region inside the casing to the refrigerant circulation line connected to an intake side or a discharge side of the compressor outside the casing.

13. The method of operating a refrigerator according to claim 12,
wherein the extraction step includes a first extraction-amount adjustment step of adjusting an extraction amount to the intake side or the discharge side of the middle-stage compressor on the basis of a differential pressure between a pressure of a region closer to the middle-stage compressor than to the expander, in the region inside the casing, and a pressure of a region closer to the expander than to the middle-stage compressor in the region.

14. The method of operating a refrigerator according to claim 12,
wherein the extraction step includes a second extraction-amount adjustment step of adjusting an extraction amount to the intake side or the discharge side of the middle-stage compressor on the basis of a temperature difference between a temperature of a region closer to the middle-stage compressor than to the expander, in the region inside the casing, and a temperature of a region closer to the expander than to the middle-stage compressor in the region.

15. The method of operating a refrigerator according to claim 12,
wherein the extraction step includes a third extraction-amount adjustment step of adjusting an extraction amount from the region inside the casing to the intake side of the compressor on the basis of at least one of COP of the refrigerator or a refrigerant temperature difference between an intake side and a discharge side of the expander.

16. The method of operating a refrigerator according to claim 12,
wherein the middle-stage compressor comprises a centrifugal compressor including a compressor impeller fixed to an end of the first motor,
wherein the expander comprises a centrifugal expander including a turbine impeller fixed to another end of the first motor, and
wherein the compression step and the expansion step include adjusting pressures to be substantially the same at a back side of the centrifugal compressor and at a back side of the centrifugal expander.

* * * * *